United States Patent [19]

Engdahl

[11] Patent Number: 4,627,888
[45] Date of Patent: Dec. 9, 1986

[54] CAUSTICIZING METHOD

[75] Inventor: Holger Engdahl, Savonlinna, Finland

[73] Assignee: Enso-Gutzeit Oy, Helsinki, Finland

[21] Appl. No.: 582,455

[22] Filed: Feb. 22, 1984

[30] Foreign Application Priority Data

Feb. 23, 1983 [FI] Finland ................................. 830606

[51] Int. Cl.$^4$ ............................................. C01F 5/24
[52] U.S. Cl. .................................. 162/30.11; 162/47; 423/432; 423/640; 423/DIG. 3
[58] Field of Search ................. 423/432, DIG. 3, 640; 162/47, 30.11, 29

[56] References Cited

U.S. PATENT DOCUMENTS

| | | | |
|---|---|---|---|
| 1,862,176 | 6/1932 | Church et al. | 423/432 |
| 2,552,183 | 5/1951 | Knight | 162/30.11 |
| 2,888,324 | 5/1959 | Allen | 423/640 |
| 2,902,346 | 9/1959 | Volk | 423/640 |
| 2,979,380 | 4/1961 | Miller | 423/432 |
| 3,194,638 | 7/1965 | Neuville | 162/30.11 |
| 3,531,370 | 9/1970 | Gould | 162/29 |
| 3,677,703 | 7/1972 | Minnick | 423/640 |
| 4,159,922 | 7/1979 | Cosper | 423/265 |
| 4,302,281 | 11/1981 | Ryham | 162/30.11 |
| 4,451,443 | 5/1984 | Libby | 423/432 |

FOREIGN PATENT DOCUMENTS

| | | | |
|---|---|---|---|
| 00931 | 11/1979 | PCT Int'Appl. | |
| 431145 | 7/1935 | United Kingdom | 423/432 |
| 941900 | 11/1963 | United Kingdom | 423/432 |

Primary Examiner—John Doll
Assistant Examiner—Wayne A. Langel
Attorney, Agent, or Firm—Toren, McGeady, Stanger, Goldberg & Kiel

[57] ABSTRACT

The present invention seeks to provide a method in which the soda lye obtained as a result of cellulose cooking process and unslaked lime are used for producing white liquor which can be re-used in the cooking process. In this method, the heat released by the slaking of lime with soda lye is recovered by a high pressure slaking process wherein the heat is transferred, either to the steam separating from the lye, which steam is then led to the desired application, or to some other medium to be heated. The present invention is characterized in that the soda lye to be causticized is divided into two parts, one of which is used for the slaking of lime by adding to it all the unslaked lime needed for the causticizing process, and that, following slaking, the two volumes are brought together for the actual causticizing reaction involving the total amount of lye needed. The present invention provides the advantage that the amount of lye needed is smaller, and so the temperature can be increased.

4 Claims, 1 Drawing Figure

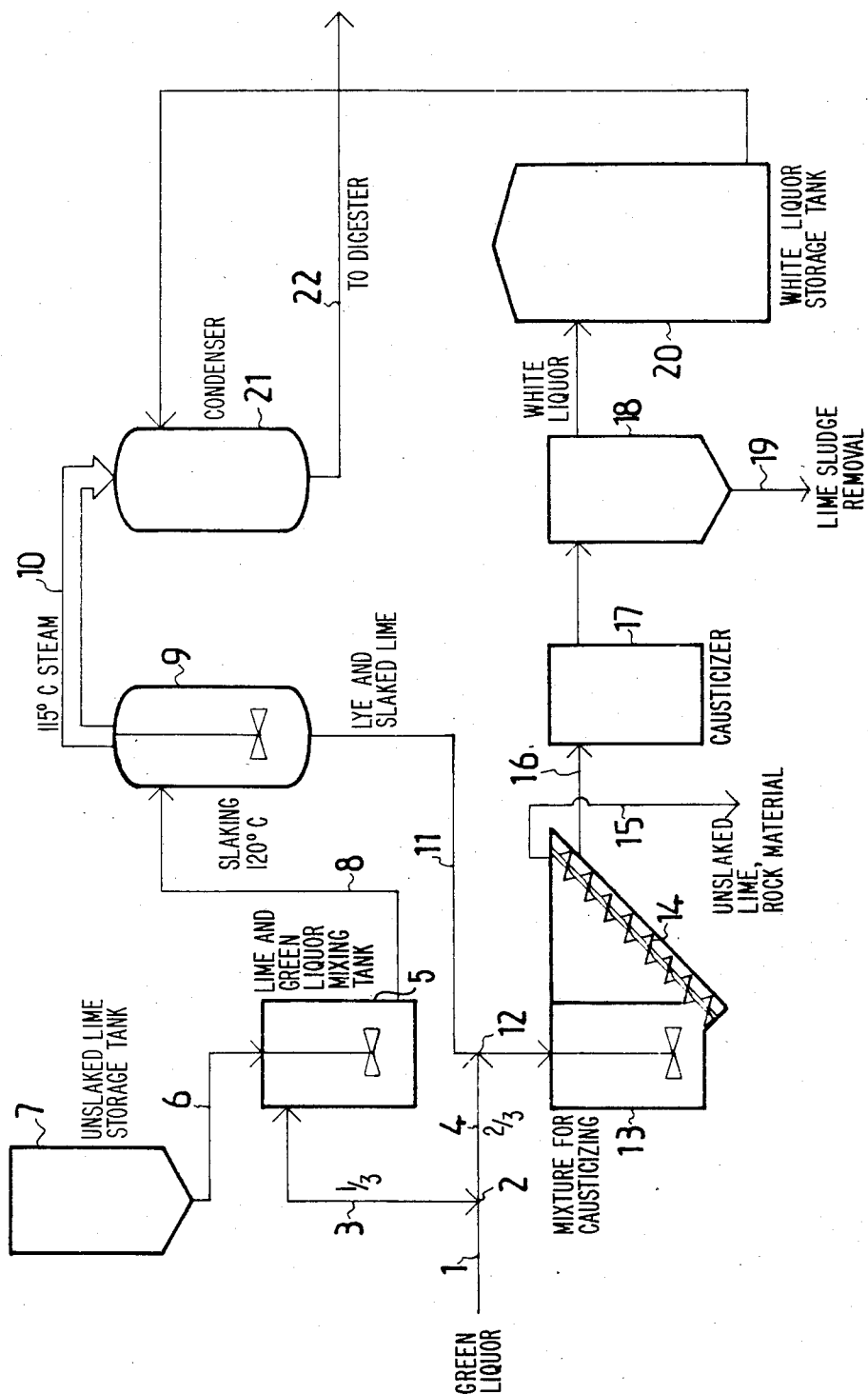

CAUSTICIZING METHOD

The object of the present invention is to provide a method for producing white liquor and lime sludge from soda lye and unslaked lime by employing a lime slaking process and thereafter the actual causicizing reaction, wherein the slaking of the lime with soda lye is carried out so that the heat energy thereby released is transferred, either to the steam separating from the soda lye which steam is then led to the desired application, or to some other medium to be heated, and after the slaking and heat transfer processes have been completed, the actual causticizing reaction is initiated.

The lye used in cooking sulphate cellulose pulp is recovered mainly in the form of soda lye or green liquor which contains sodium carbonate and which is causticized with unslaked lime to produce white liquor which consists mainly of sodium hydroxide. Following potential intermediate storage, this white liquor is re-used in the cooking of cellulose. Another product obtained as a result of the causticizing reaction is calcium carbonate-containing lime sludge, which is then calcinated in a lime sludge reburning kiln to produce unslaked lime for use in subsequent causticizing processes.

The first reaction to take place in the course of a causticizing process is the slaking of lime due to the water contained in soda lye:

$$CaO + H_2O \rightarrow Ca(OH)_2$$

The reaction is fast and strongly exothermal, i.e. it releases a great amount of heat. Following this, the actual causticizing reaction takes place, wherein the slaked lime reacts with sodium carbonate contained in the lye:

$$Ca(OH)_2 + Na_2CO_3 \rightleftharpoons 2NaOH + CaCO_3$$

The causticizng reaction is slow and achieves a certain balance between the reaction products, namely sodium hydroxide and lime sludge, and the input materials. The reaction is endothermal, i.e. it is heat-absorbing, although the amount of heat absorbed is substantially smaller than the heat released by the slaking of lime.

In the causticizing processes currently employed, the heat released by the slaking of lime is normally not recovered but allowed to escape. It has been suggested that the heat be transferred to cooling water but such water, with a temperature of 60° to 80° C., cannot be exploited effectively in modern closed-circuit processes in use at cellulose mills.

In one known causticizing method, the heat released by the slaking of lime is applied to the white liquor obtained as an end product of the process, whereby savings can be made in the fuel needed for heating the lye to be used for cellulose cooking. However, the equipment needed for this process requires high capital expenditure because pressure vessels are necessary at every phase of the process due to the fact that the transfer of heat is effected by employing a process which takes place under a pressure which is higher than the atmospheric pressure. Moreover, pressurization reduces the size of the white liquor storage tank, which makes it more difficult to equalize production fluctuations and causes the disturbances of the causticizing process to be reflected on cellulose cooking as well, whereby process control is complicated. An additional problem is that the lime sludge and other waste products obtained as a result of the process have an exit temperature which is higher than the boiling point of the lye, and so heat energy is lost.

Another known method is to carry out the causticizing process so that the heat is recovered at the lime slaking phase which takes place under pressure, i.e. prior to the actual causticizing reaction. This methos avoids the loss of heat due to unnecessary heating of lime sludge and other waste products.

The object of the present invention is to provide a causticizing method in which the heat released by lime slaking can be transferred to white liquor or recovered for other purposes more effectively than hitherto. The present invention is characterized in that the soda lye to be causticized is divided into two parts, one of which is used for the slaking of lime by adding to it all the unslaked lime needed for the causticizing process, and that, following slaking, the two parts are brought together for the actual causticizing reaction.

The present invention provides the advantage that the slaking of lime, which is carried out under pressure, can be effected with a minimum amount of soda lye, with the result that the temperature of the steam separating from the lye, or that of some other heat-transferring medium, is higher than before.

The high temperature obtained in the slaking phase when using a process in accordance with the present invention is based on a high-pressure system. However, the high-pressure process should be confined to the slaking phase, i.e. the actual causticizing reaction following the slaking of lime should be carried out under normal atmospheric pressure.

In accordance with the present invention, the division of the soda lye to be causticized is carried out so that the amount of lye which is used for the slaking of the lime is at the most one half, preferably one fifth, of the total amount of lye to be causticized.

The transfer of the heat from the lime slaking process to white liquor can be effected by allowing the lye to vapourize whereby the steam so produced can act as the heat-transferring medium. Another possibility is to transfer the heat directly to white liquor or to some other medium, which is then used for heating white liquor.

The present invention is explained in greater detail by means of examples and by referring to the enclosed drawing showing equipment designed for employing a process in accordance with the present invention.

The soda—or green liquor—to be causticized (with a temperature of 95° C.) is led to the equipment illustrated in the drawing via inlet pipe (1). Inlet pipe (1) divides into two pipes (3 and 4) at point (2), and one third (⅓) of the green liquor flow is routed via pipe (3) and two thirds (⅔) via pipe (4).

The slaking of the unslaked lime used in the causticizing process is carried out in the equipment with that green liquor which is led via pipe (3). Pipe (3) is connected to a mixing tank (5) into which unslaked lime is fed via pipe (6) from storage tank (7). In mixing tank (5) lime and reen liquor are mixed at great speed, whereafter the mixture is pumped via pipe (8) into pressurized expansion tank (9). The exothermal slaking reaction between lime and the water contained in the green liquor takes place in expansion tank (9), and the tank pressure is so adjusted that the mixture of lime and green liquor first reaches the boiling point (120° C.) corresponding to the prevailing pressure, and the rest of the heat released by the reaction is used up by the vapourization of the water contained in the mixture. The 115° C. steam hereby obtained passes to pipe (10), and the lye containing the slaked lime leaves tank (9) via pipe (11).

The next phase of the causticizing process is the actual causticizing reaction between slaked lime and the sodium carbonate in the green liquor, for which the flows in pipes (4) and (11) converge at point (12) and the material is first led into screen (13). Screen (13) is pressure-less, and the temperature of the mixture led into it is 104° C., i.e. lower than its boiling point. Screen (13) is designed to separate from the mixture to be causticized unslaked lime and rock material which is removed with conveyor (14) into pipe (15). Screen (13) is connected with pipe (16) to causticizing tank (17) where the actual causticizing reaction takes place. Following causticizing, lime sludge is removed from white liquor in screen (18) and led into pipe (19). White liquor is led from screen (18) into pressure-less storage tank (20).

The white liquor hereby obtained is stored in tank (20) and used for the cooking of cellulose. It is heated for cooking in condenser (21) into which is fed steam generated by the slaking of lime via pipe (10). Condenser (21) condenses the steam while raising the white liquor temperature to 110° C., at which temperature it is led into the digester via pipe (22).

It is obvious for those skilled in the art that the various applications of the present invention are not confined to the above examples but can vary within the patent claims presented herein.

I claim:

1. A causticizing method for producing white liquor and lime sludge from soda lye and unslaked lime using a lime slaking process which is carried out under pressure, followed by a causticizing reaction which is carried out under normal atmospheric pressure, and using the heat released from the lime slaking for heating purposes, wherein the soda lye to be causticized is divided into two parts, one of which is used for the slaking of lime by adding to it all the unslaked lime needed for the causticizing process and is, at most, one half of the total amount of lye to be causticized, and after slaking, bringing the two volumes together for the causticizing reaction involving the total amount of lye used.

2. The method of claim 1 wherein the soda lye is allowed to vaporize in connection with the slaking of lime and the steam generally is used for heating white liquor which is led into a cellulose cooking process.

3. The method of claim 1 wherein the amount of lye used is about one fifth of the total amount of lye to be causticized.

4. The method of claim 1 wherein the soda lye feed is from a cellulose cooking process.

* * * * *